J. E. SPEYER.
SOFT COLLAR BUTTON.
APPLICATION FILED JUNE 26, 1918.

1,343,096.

Patented June 8, 1920.

WITNESSES

INVENTOR
J. E. Speyer
BY Victor J. Evans
ATTORNEY

UNITED STATES PATENT OFFICE.

JOHN E. SPEYER, OF LE GRAND, CALIFORNIA, ASSIGNOR OF ONE-HALF TO ARTHUR L. HEDGES, OF SAN FRANCISCO, CALIFORNIA.

SOFT-COLLAR BUTTON.

1,343,096. Specification of Letters Patent. Patented June 8, 1920.

Application filed June 26, 1918. Serial No. 242,058.

*To all whom it may concern:*

Be it known that I, JOHN E. SPEYER, a citizen of the United States, residing at Le Grand, in the county of Merced and State of California, have invented new and useful Improvements in Soft-Collar Buttons, of which the following is a specification.

This invention is an improved soft collar holder adapted to hold the outer folds of a soft collar in place and prevent them from creasing up and wrinkling, the object of the invention being to provide an improved device of this character which is extremely cheap and simple and which may be readily applied and arranged for use.

The invention consists of a bar having a centrally located loop to engage the collar button and hold the bar against movement, and buttons loosely pivotally connected to the ends of the bar and adapted to engage in the button holes of the outer folds of a soft collar, as hereinafter described and claimed.

In the accompanying drawings:—

Figure 1:
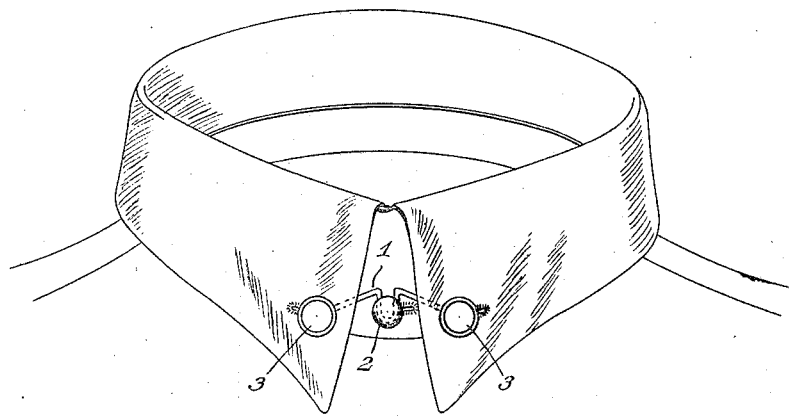
Figure 1 is a perspective view of a soft collar holder constructed and arranged in accordance with my invention and showing the same in use.
Figure 2:
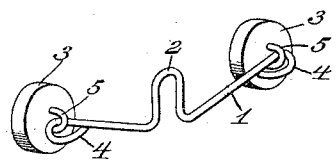
Fig. 2 is a detailed perspective view of the same.

My improved soft collar holder comprises a bar 1 having a centrally located loop 2 for engagement with the front collar button and buttons 3 at the ends of the bar for engagement in the button holes of the outer folds of a soft collar. The bar is here shown as made of wire but may be of any suitable construction and is also shown as provided with eyes 4 at the ends, the buttons 3 having eyes 5 which engage the eyes of the bar so that the said buttons are loosely pivotally connected to the ends of the bar. The buttons may be otherwise constructed and attached to the bar within the scope of my invention and may be of any suitable design and may be ornamented in any suitable manner or jeweled if preferred.

The loop in the center of the bar and which engages the front collar button serves to hold the bar stationary and hence the holder prevents the outer folds of the collar from moving and from creeping and wrinkling, the device serving to hold the soft collar in the desired position and causing the same to present a fresh and finished appearance.

While I have herein shown and described a preferred form of my invention I would have it understood that changes may be made in the form, proportion and construction of the several parts, without departing from the spirit of my invention and within the scope of the appended claim.

Having thus described my invention, I claim:—

A soft collar holder comprising: a substantially inverted V shaped bar having a loop formed at its apex for engagement with the collar button, and its ends also looped, and a pair of buttons each having an eye for loose connection with a looped end of the bar.

In testimony whereof I affix my signature.

JOHN E. SPEYER.